(12) United States Patent
Li

(10) Patent No.: US 11,137,642 B2
(45) Date of Patent: Oct. 5, 2021

(54) TRANSPARENT LIQUID CRYSTAL DISPLAY PANEL, METHOD OF DRIVING THE SAME, AND TRANSPARENT LIQUID CRYSTAL DISPLAY INCLUDING THE SAME

(71) Applicant: BOE TECHNOLOGY GROUP CO., LTD., Beijing (CN)

(72) Inventor: Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/770,879

(22) PCT Filed: Feb. 20, 2020

(86) PCT No.: PCT/CN2020/075937
§ 371 (c)(1),
(2) Date: Jun. 8, 2020

(87) PCT Pub. No.: WO2020/181967
PCT Pub. Date: Sep. 17, 2020

(65) Prior Publication Data
US 2021/0132443 A1 May 6, 2021

(30) Foreign Application Priority Data

Mar. 11, 2019 (CN) .......................... 201910180507.2

(51) Int. Cl.
G02F 1/1335 (2006.01)
G02F 1/1343 (2006.01)
G09G 3/36 (2006.01)
(52) U.S. Cl.
CPC .. *G02F 1/133607* (2021.01); *G02F 1/133528* (2013.01); *G02F 1/134336* (2013.01); *G09G 3/3696* (2013.01)

(58) Field of Classification Search
None
See application file for complete search history.

(56) References Cited

U.S. PATENT DOCUMENTS

| 9,229,267 B2 | 1/2016 | Hong et al. |
| 2014/0022499 A1 | 1/2014 | Tamaki et al. |

(Continued)

FOREIGN PATENT DOCUMENTS

| CN | 103399444 A | 11/2013 |
| CN | 105572984 A | 5/2016 |

(Continued)

OTHER PUBLICATIONS

Office Action of CN Application No. 201910180507.2 and English translation, dated Apr. 24, 2020, 11 pages.

(Continued)

*Primary Examiner* — Phu Vu
(74) *Attorney, Agent, or Firm* — Muncy, Geissler, Olds and Lowe, P.C.

(57) ABSTRACT

A transparent liquid crystal display panel is provided, including a first substrate and a second substrate oppositely to each other, where the first substrate is configured to enable light incident therein to be transmitted through a reflection; a liquid crystal layer between the first substrate and the second substrate; a first grating layer between the liquid crystal layer and the first substrate, where the first grating layer includes a plurality of first gratings arranged in an array; a first electrode layer between the first grating layer and the liquid crystal layer, where the first electrode layer includes a plurality of first electrodes arranged in an array; and a second electrode layer between the liquid crystal layer and the second substrate; an orthographic projection of each of the first gratings onto the first substrate at least partially covers an area between orthographic projections of two adjacent first electrodes onto the first substrate; where the (Continued)

liquid crystal layer is configured to form a plurality of liquid crystal prisms arranged in an array in the case that voltages are applied to the plurality of first electrodes and the second electrode layer respectively, to enable light emitted from the plurality of liquid crystal prisms to return to the plurality of liquid crystal prisms after being reflected by the second substrate.

16 Claims, 3 Drawing Sheets

(56) References Cited

U.S. PATENT DOCUMENTS

| | | | |
|---|---|---|---|
| 2014/0300845 A1 | 10/2014 | Tamaki et al. | |
| 2016/0018680 A1 | 1/2016 | Wang et al. | |
| 2018/0107059 A1 | 4/2018 | Zhao et al. | |
| 2018/0292664 A1 | 10/2018 | Wang et al. | |
| 2019/0094606 A1* | 3/2019 | Li | G02B 6/0035 |
| 2019/0121171 A1 | 4/2019 | Tan | |
| 2019/0129257 A1 | 5/2019 | Wang et al. | |
| 2019/0257993 A1* | 8/2019 | Kim | G02B 5/32 |
| 2019/0258110 A1 | 8/2019 | Li et al. | |

FOREIGN PATENT DOCUMENTS

| | | |
|---|---|---|
| CN | 105974668 A | 9/2016 |
| CN | 106154683 A | 11/2016 |
| CN | 206074956 U | 4/2017 |
| CN | 106647003 A | 5/2017 |
| CN | 106647093 A | 5/2017 |
| CN | 106773379 A | 5/2017 |
| CN | 107797338 A | 3/2018 |
| CN | 109031736 A | 12/2018 |
| CN | 109061932 A | 12/2018 |
| CN | 109683388 A | 4/2019 |

OTHER PUBLICATIONS

International Search Report of PCT/CN2020/075937 and English translation, dated May 8, 2020, 16 pages.

* cited by examiner

TRANSPARENT LIQUID CRYSTAL DISPLAY PANEL, METHOD OF DRIVING THE SAME, AND TRANSPARENT LIQUID CRYSTAL DISPLAY INCLUDING THE SAME

CROSS-REFERENCE TO RELATED APPLICATIONS

This application is the U.S. national phase of PCT Application PCT/CN2020/075937 filed on Feb. 20, 2020, which claims a priority to Chinese Patent Application No. 201910180507.2 filed on Mar. 11, 2019, the disclosures of which are incorporated in their entirety by reference herein.

TECHNICAL FIELD

The present disclosure relates to the field of liquid crystal display technology, and in particular, to a transparent liquid crystal display panel and a method of driving the same, and a transparent liquid crystal display including the same.

BACKGROUND

Liquid crystal displays have been widely used in a wide variety of applications due to their advantages of high color gamut, lightweight, short response time, and the like. However, when the liquid crystal display in the related art is applied in the technical field of transparent display, the transparency of the transparent liquid crystal display is low.

SUMMARY

A transparent liquid crystal display panel is provide in an embodiment of the present disclosure, including: a first substrate and a second substrate oppositely to each other, where the first substrate is configured to enable light incident therein to be transmitted through a reflection; a liquid crystal layer between the first substrate and the second substrate; a first grating layer between the liquid crystal layer and the first substrate, where the first grating layer includes a plurality of first gratings arranged in an array; a first electrode layer between the first grating layer and the liquid crystal layer, where the first electrode layer includes a plurality of first electrodes arranged in an array; and a second electrode layer between the liquid crystal layer and the second substrate; where the liquid crystal layer is configured to form a plurality of liquid crystal prisms arranged in an array in the case that voltages are applied to the plurality of first electrodes and the second electrode layer respectively, to enable light emitted from the plurality of liquid crystal prisms to return to the plurality of liquid crystal prisms after being reflected by the second substrate.

Optionally, the light emitted from the plurality of liquid crystal prisms returns to the plurality of liquid crystal prisms again after being total reflected by the second substrate.

Optionally, the transparent liquid crystal display panel further includes: a first dielectric layer between the liquid crystal layer and the second substrate, where a refractive index of the first dielectric layer is lower than a refractive index of the second substrate.

Optionally, the transparent liquid crystal display panel further includes: a second grating layer between the first grating layer and the first electrode layer, where the second grating layer includes a plurality of second gratings arranged in an array, and an orthographic projection of each second grating onto the first substrate is between orthographic projections of two adjacent first gratings onto the first substrate.

Optionally, the first grating layer further includes a plurality of second gratings arranged in an array, and an orthographic projection of each second grating onto the first substrate is between orthographic projections of two adjacent first gratings onto the first substrate.

Optionally, the plurality of second gratings are configured to enable light incident thereon to exit perpendicularly to the first substrate.

Optionally, an orthographic projection of each of the first gratings onto the first substrate at least partially covers an area between orthographic projections, of two adjacent first electrodes at two sides of the first grating and adjacent to the first grating, onto the first substrate.

Optionally, the second electrode layer includes a common electrode layer, and in the array of plurality of first electrodes, the first electrodes even-numbered columns are configured to receive a first voltage, and the first electrode odd-numbered columns are configured to receive a second voltage different from the first voltage.

Optionally, the liquid crystal layer is further configured to enable an intensity of the light emitted from the plurality of liquid crystal prisms varies with a change in at least one of the first voltage and the second voltage.

Optionally, the transparent liquid crystal display panel further includes one or more of: a liquid crystal alignment layer on at least one of a first surface of the liquid crystal layer adjacent to the first substrate and a second surface of the liquid crystal layer adjacent to the second substrate; a second dielectric layer between the liquid crystal layer and the first electrode layer; and a planarization layer between the first electrode layer and the first grating layer.

A transparent liquid crystal display is further provided in an embodiment of the present disclosure, including: the transparent liquid crystal display panel hereinabove; and a light source at a lateral side of the first substrate and configured to emit light into the first substrate.

Optionally, the light source includes a first sub-light source configured to generate red light, a second sub-light source configured to generate green light and a third sub-light source configured to generate blue light, and each display frame of the transparent liquid crystal display includes a first period, a second period and a third period, where the first sub-light source is configured to emit light during the first period, the second sub-light source is configured to emit light during the second period, and the third sub-light source is configured to emit light during the third period.

Optionally, the transparent liquid crystal display further includes a polarizing plate attached to a light emitting surface of the light source.

A method of driving the transparent liquid crystal display panel hereinabove is further provided in an embodiment of the present disclosure, including: applying voltages to the plurality of first electrodes and the second electrode layer respectively, such that the liquid crystal layers form a plurality of liquid crystal prisms arranged in an array, to enable light emitted from the plurality of liquid crystal prisms to return to the plurality of liquid crystal prisms after being reflected by the second substrate.

Optionally, the second electrode layer includes a common electrode layer, and the method further includes: applying a first voltage to the first electrodes in even-numbered columns of the array of plurality of first electrodes and applying a second voltage different from the first voltage to the first electrodes in odd-numbered columns of the array of plurality of first electrodes.

Optionally, the method further includes: changing an intensity of the light emitted from the plurality of liquid crystal prisms by changing at least one of the first voltage and the second voltage.

DETAILED DESCRIPTION

Figure 1:
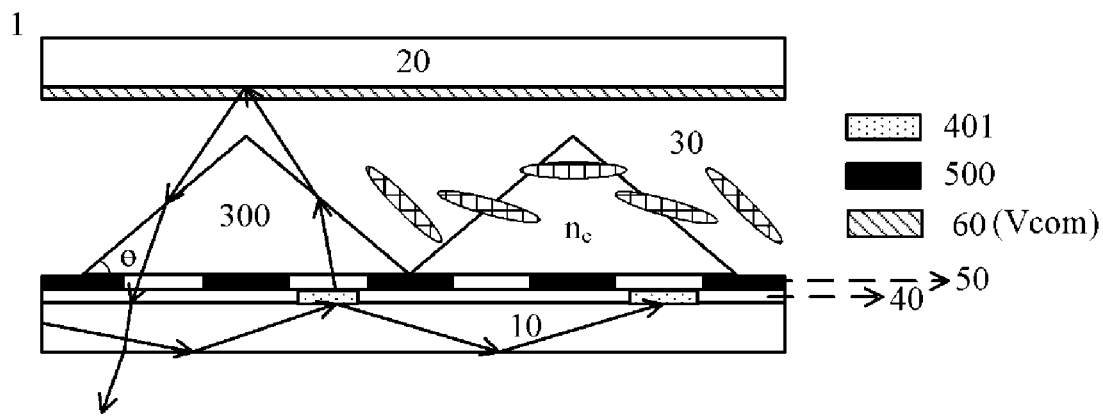
FIG. 1 is a cross-sectional view of a transparent liquid crystal display panel in an embodiment of the present disclosure.

A transparent liquid crystal display in an embodiment of the present disclosure will be explained and explained in more detail below with reference to the drawings. It should be noted that a transparent liquid crystal display in some embodiments of the present disclosure is shown by way of example only in the drawings and is described in detail in the following description. However, none of these illustrations and descriptions should be construed as limiting the disclosure in any way. Indeed, those skilled in the art, having the benefit of the technical teachings of the present disclosure, will be able to contemplate other suitable alternatives depending upon the actual circumstances.

For a liquid crystal display in the related art, in order to obtain a modulation of a polarization state of light so as to realize, for example, display of different gray scales, it is necessary to provide polarizing plates, such as two polarizing plates whose polarization directions are perpendicular to each other, respectively on both upper and lower sides of the liquid crystal layer. Thus, when such a liquid crystal display is applied to the technical field of transparent display, due to the two polarizing plates, more adverse absorption of the ambient light will occur, resulting in a large reduction in the transparency of the transparent liquid crystal display.

In view of this, a transparent liquid crystal display having a greater transmittance is provided in an embodiment of the present disclosure, i.e., having a greater transparency for ambient light than a transparent liquid crystal display having a polarizing plate in the related art.

Referring to FIG. 1 which is a cross-sectional view of a transparent liquid crystal display panel in an embodiment of the present disclosure. As shown in FIG. 1, the transparent liquid crystal display panel 1 may include an oppositely disposed lower substrate 10 and an upper substrate 20, and a liquid crystal layer 30 (such as a liquid crystal layer 30 having a thickness of 13 microns) between the upper substrate 20 and the lower substrate 10. Further, the transparent liquid crystal display panel 1 may receive incident light from the left side of the lower substrate 10, and after entering the lower substrate 10, the incident light may propagate from left to right, for example, by the total internal reflection on the upper and lower surfaces of the lower substrate 10, as shown schematically by arrows in FIG. 1.

Referring to FIG. 1, in the transparent liquid crystal display panel 1, particularly between the lower substrate 10 and the liquid crystal layer 30, a first grating layer 40 and a first electrode layer 50 may also be arranged. Specifically, the first grating layer 40 may include a plurality of first gratings 401 (e.g., a grating period of 300 nm and a duty cycle of 50%) arranged in an array, and the first electrode layer 50 may include a plurality of first electrodes 500 arranged in an array. For example, the orthographic projection of each first grating 401 onto the lower substrate 10, at least partially covers an area between orthographic projections of adjacent two first electrodes 500 (e.g., the two first electrodes 500 on the left and right sides, respectively, of the first grating 401 in FIG. 1) onto the lower substrate 10. On the upper side of the liquid crystal layer 30 of the transparent liquid crystal display panel 1, i.e., between the liquid crystal layer 30 and the upper substrate 20, another second electrode layer 60 may be arranged. By way of example, the second electrode layer 60 may include a common electrode layer configured to receive a common voltage Vcom, such as a common voltage Vcom of 0V.

As shown in FIG. 1, in the transparent liquid crystal display panel 1, since the first grating layer 40 (specifically, including a plurality of first gratings 401 arranged in an array) is arranged on the upper surface of the lower substrate 10, the total internal reflection of the light originally propagated in the lower substrate 10 at the upper surface of the lower substrate 10 will be broken, which results in that the light passes through the first grating 401 and escapes from the upper side of the lower substrate 10 and enters into the liquid crystal layer 30 (after passing through the intermediate first electrode layer 50, of course), for example, as shown by an arrow diagonally upward from the first grating 401 on the left in FIG. 1.

Further, referring to FIG. 1, in the transparent liquid crystal display panel 1, by applying an appropriate voltage to each of the first electrodes 500 in the first electrode layer 50 and the corresponding second electrode layer 60, the liquid crystal molecules in the liquid crystal layer 30 can be driven to deflect to a corresponding degree, thereby forming a plurality of liquid crystal prisms 300 arranged in an array. Next, this specific process of forming the plurality of liquid crystal prisms 300 in the liquid crystal layer 30 will be explained and explained in more detail with reference to FIGS. 1, 2, and 3a-3b.

Figure 2:
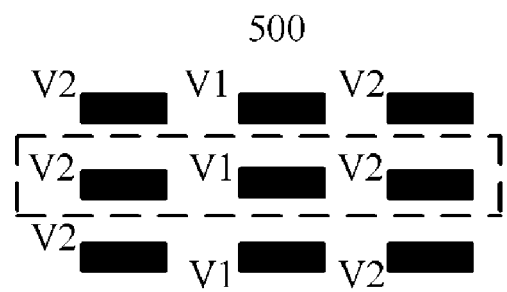
FIG. 2 is a partial plan view of a first electrode layer in the transparent liquid crystal display panel shown in FIG. 1.

For example, referring to FIG. 2 which is a partial plan view of a first electrode layer in the transparent liquid crystal display panel shown in FIG. 1, as can be seen from FIG. 2, in the first electrode layer 50 of the transparent liquid crystal display panel 1, a plurality of first electrodes 500 may be arranged in an 3×3 array. Of course, it should be noted that the 3×3 array arrangement of the first electrode illustrated herein as an example represents only one embodiment of the present disclosure, but should not be construed as any limitation of the present disclosure. Indeed, in light of the teachings of the present disclosure, those skilled in the art will be able to select other suitable number of rows and/or columns for the array arrangement of the plurality of first electrodes 500 depending upon the particular circumstances, and the present disclosure is intended to encompass all such alternative implementations.

Referring to FIG. 2, in the transparent liquid crystal display panel in an embodiment of the present disclosure, a plurality of first electrodes 500 may be respectively applied with a first voltage V1 and a second voltage V2, where the first voltage V1 is not equal to the second voltage V2. Specifically, as shown in FIG. 2, a first voltage V1 may be applied to the first electrode 500 in an even-numbered column (for example, the second column), while a second voltage V2 may be applied to the first electrode 500 in odd-numbered columns (for example, the first column and the third column). As an example, the first voltage V1 may be 0V, and the second voltage V2 may be 6V. At the same time, a common voltage Vcom of 0V may be applied to the common second electrode layer 60 at the upper surface of the liquid crystal layer 30. Of course, all these values represent one example only and are not intended to be limiting. In such an embodiment, the liquid crystal molecules in the liquid crystal layer 30 will deflect to different degrees under the action of voltages (including the first voltage V1, the second voltage V2, and the common voltage Vcom). For example, at a position vertically corresponding to the first electrode 500 to which the first voltage V1=0V is applied, the liquid crystal molecules will not deflect because the upper and lower voltage difference is minimum (zero, V1−Vcom=0V−0V=0). In contrast, at a position vertically corresponding to the first electrode 500 to which the second voltage V2=6V is applied, the liquid crystal molecules will deflect to the greatest extent due to the maximum difference between the upper and lower voltages (6V, V2−Vcom=6V−0V=6V). Obviously, if located between these two positions, the liquid crystal molecules will deflect to an intermediate degree. This deflection state of the liquid crystal molecules is schematically shown, for example, in FIG. 1 with an ellipse having a shaded pattern.

It can thus be seen that liquid crystal molecules in the liquid crystal layer 30 at different lateral positions (i.e., different positions in the extension plane of the substrate) can be deflected to different degrees by applying two different voltages alternately in space (i.e., the first voltage V1 and the second voltage V2) on the plurality of first electrodes 500 in the array (i.e., the first voltage V1 and the second voltage V2 are respectively applied to the two adjacent columns of the first electrodes 500). In particular, this deflection state of the liquid crystal molecules in the liquid crystal layer 30 is also spatially periodically distributed across the extended plane of the entire substrate, where one spatially periodic unit is schematically shown in FIG. 1 with five ellipses having a shadow pattern. In this manner, when the first voltage V1, the second voltage V2, and the common voltage Vcom are applied, for example, a plurality of liquid crystal prisms 300 arranged in an array are generated in the liquid crystal layer 30, where each of the liquid crystal prisms 300 corresponds to one spatially periodic unit of the deflection state of the liquid crystal molecules. In addition, each liquid crystal prism 300 will also be associated with, for example, three first electrodes 500, such as the three first electrodes 500 enclosed by dashed lines in FIG. 2. In addition, among the three first electrodes 500, two first electrodes 500 located on the outside are applied with the same voltage (for example, the second voltage V2), while the first electrode 500 located at the center is applied with another voltage (for example, the first voltage V1).

Further, from the above analysis of the formation process of the liquid crystal prism 300, it can also be seen that each liquid crystal prism 300 formed optically equivalently will change with the change of the second voltage V2 (assuming that both the first voltage V1 and the common voltage Vcom are kept at zero). Generally, the optical prism can be represented by two parameters, i.e., the refractive index and the bottom angle. Therefore, when the first voltage V1, the second voltage V2 and the common voltage Vcom are applied, each of the liquid crystal prisms 300 formed equivalently may also have corresponding parameters, a bottom angle, and a refractive index, and they will vary as the voltage changes. In this optical equivalent process, the refractive index of the liquid crystal prism 300 formed equivalently may be fixed, for example, the non-constant light refractive index ne of the liquid crystal, and express the different equivalent liquid crystal prisms formed at different voltages by the bottom angle. For example, in the embodiment described above, if the first voltage V1 and the common voltage Vcom are kept at zero, the bottom angle θ of each liquid crystal prism 300 formed can be changed by changing the value of the second voltage V2. Of course, it will be appreciated by those skilled in the art that in an alternative embodiment, if the second voltage V2 remains unchanged, the bottom angle θ of the formed liquid crystal prism 300 may also vary with changes in the first voltage V1. That is, by changing the second voltage V2 (or the first voltage V1) applied to the first electrode 500, the bottom angle θ of the plurality of liquid crystal prisms 300 generated in the liquid crystal layer 30 may be changed, thereby causing light incident into the liquid crystal layer 30 from the underside of the liquid crystal layer 30 (i.e., from the first grating 401) at an angle to be deflected at different degrees of angle, and incident onto the second electrode layer 60 (and also the second substrate 20) from the upper side of the liquid crystal layer 30 at different angles. This means that by proper selection of the value of the second voltage V2 (or the first voltage V1), light from the liquid crystal layer 30 (i.e., exiting upwardly from the plurality of equivalent liquid crystal prisms 300) can be incident on the lower surface of the second substrate 20 at different angles of incidence after passing through the second electrode layer 60 (in particular, an angle of incidence greater than the total reflection critical angle), and then returns to the liquid crystal layer 30 again after being reflected by the lower surface of the second substrate 20. In particular, if the light incident on the second substrate 20 from the plurality of equivalent liquid crystal prisms 300 has an incident angle greater than the total reflection critical angle, the light will be totally reflected on the lower surface of the second substrate 20, and thus returns to the liquid crystal prisms 300 again. In this manner, it is ensured that no light is leaked from above the second substrate 20, thereby improving the light availability and the display effect. As schematically shown by arrows in FIG. 1, after being totally reflected by the lower surface of the second substrate 20, light will have the opportunity to return again to the liquid crystal layer 30, i.e., to the plurality of liquid crystal prisms 300, and finally escape from the lower surface of the lower substrate 10 after refracted at the liquid crystal prisms 300, the first electrode layer 50, the first grating layer 40, the lower substrate 10 and the like.

Figure 3A:
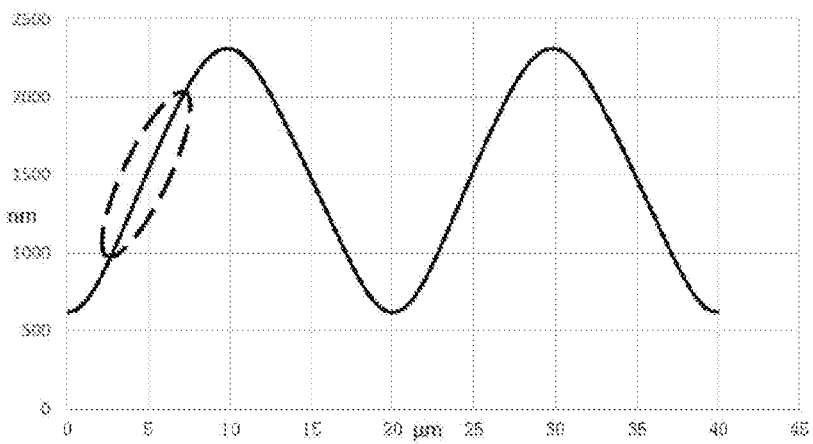
FIGS. 3a and 3b schematically show simulated equivalent optical path diagrams of liquid crystal prisms formed in a transparent liquid crystal display panel in an embodiment of the present disclosure.
Figure 3B:
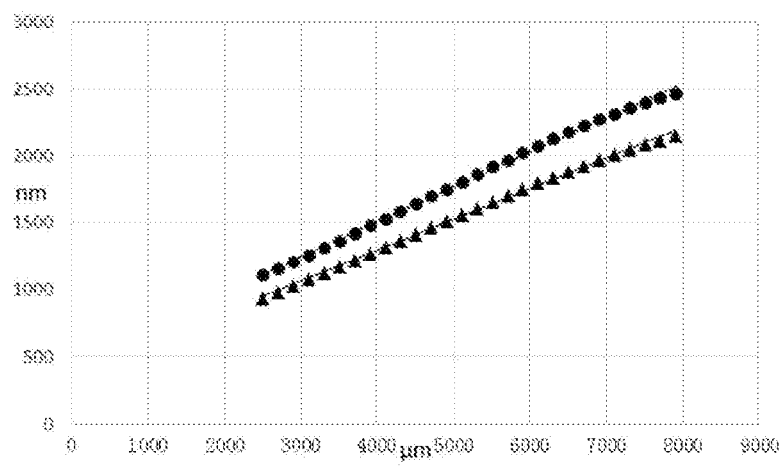

By way of example, FIGS. 3a and 3b schematically show simulated equivalent optical path diagrams of liquid crystal prisms formed in a transparent liquid crystal display panel in an embodiment of the present disclosure. Specifically, in FIG. 3a, the abscissa represents different lateral positions in microns (μm) in the transparent liquid crystal display panel, and the ordinate represents simulated optical path values in nanometers (nm) in the transparent liquid crystal display panel. In the simulation result of FIG. 3a, the thickness of the liquid crystal layer in the transparent liquid crystal display panel used is 10 µm, the width of the first electrode 500 is 3 µm, the interval between two adjacent first electrodes 500 is 7 µm, the voltage of the second electrode layer (i.e., the common voltage Vcom) is zero, the first voltage V1 is 0V, and the second voltage V2 is 7V. As can be seen from FIG. 3a, for the same incident light, the liquid crystal molecules in the liquid crystal layer will produce a spatially periodic optical path distribution. Further, FIG. 3b is an enlarged view of that part of the equivalent optical path shown in FIG. 3a, by the dashed ellipse and a linear fitting result thereof. Similarly, in FIG. 3b, the abscissa represents different lateral positions in microns (µm) in the transparent liquid crystal display panel, and the ordinate represents simulated optical path values in nm in the transparent liquid crystal display panel. At this time, in FIG. 3b, the result when the second voltage V2 is 6V is shown by a black dot, and the result when the second voltage V2 is 7V is shown by a black triangle, other relevant parameters remain the same as in FIG. 3a. By simulation, it was found that when the second voltage V2 is 6V, the equivalent refractive index portion shown by the dashed ellipse can be well fitted by means of linearity, and the fitting result under the above parameters is y=0.26x+471.12. In the case where the second voltage V2 is 7V, the linear fitting result y=0.23x+376.34 can likewise be obtained. With such simulation results, it is well confirmed that an optically equivalent liquid crystal prism may be formed by proper selection of the voltages V1, V2 and Vcom applied to the liquid crystal layer.

By the process described above, the transparent liquid crystal display panel according to the embodiment of the present disclosure may realize a normal display without a polarizer, where each liquid crystal prism formed may correspond to one display pixel or sub-pixel. At the same time, if all applied voltages, for example, the first voltage V1, the second voltage V2 and the common voltage Vcom are zero, that is, the liquid crystal molecules in the liquid crystal layer do not deflect, the ambient light will pass through the hierarchical structures one by one from top to bottom or from bottom to top, and finally be emitted from the entire display panel. In such a case, since no polarizer is arranged in the transparent liquid crystal display panel in the embodiment of the present disclosure, the transmittance of the ambient light will be greatly improved. That is, according to the embodiment of the present disclosure, since the polarizing plate is removed, the proportion of the ambient light that can pass through the entire display panel is greatly increased, thereby effectively improving the transparency of the transparent liquid crystal display panel.

According to an embodiment of the present disclosure, in the transparent liquid crystal display panel 1 shown in FIG. 1, light incident into the lower substrate 10 and propagated by, for example, total internal reflection in the lower substrate 10, will be coupled out of the lower substrate 10 by means of the first grating 401 and enter into the liquid crystal layer 30. Such a coupling-out process of the light by the first grating 401 (in particular the transmission grating) will be readily understood by a person skilled in the art, and an emergence angle of the emergent light may be provided, for example, by an appropriate selection of the grating parameters of the first grating 401. Further, strictly speaking, light coupled out of the lower substrate 10 through the first grating 401 (i.e., light obliquely incident into the liquid crystal layer 30 from the first grating 401) is not a strictly parallel light beam, but a diverging light beam typically having a relatively small diverging angle (e.g., between 5 degrees and 10 degrees). Moreover, in this diverging beam, the intensity of the light is strongest at a central angle and weakest at a maximum angle on both sides.

Based on this, in the embodiment of the present application, the display of the different gray levels is realized by the light intensity angular distribution of the diffracted and the diffraction by the first grating 401. Specifically, as described above, assuming that the common voltage Vcom on the second electrode layer 60 and the first voltage V1 on the first electrode layer 50 are both kept at zero, by changing the second voltage V2 on the first electrode layer 50, it is possible to cause the strongest light ray in the diffracted light beam from the first grating 401 at a central angular position to be totally reflected at the upper substrate 20 after passing through the liquid crystal layer 30 (i.e., the liquid crystal prism 300), and thus back into the liquid crystal layer 30 again. In this manner, it is possible to ensure that the light with the maximum intensity is emitted from the lower substrate 10 of the transparent liquid crystal display 1, thereby achieving display of the maximum gray scale (e.g., 255 gray scale). Similarly, if the second voltage V2 on the first electrode layer 50 is selected such that the weaker light in the diffracted light beam from the first grating 401 in the vicinity of the edge angle position is totally reflected at the upper substrate 20 after passing through the liquid crystal layer 30, the light finally emitted from the lower substrate 10 of the transparent liquid crystal display panel 1 will also have a weaker intensity, thereby achieving a display of a smaller gray scale (e.g., a gray scale). Based on the same concept, display of different gray scales is achieved by subdividing the diffracted diverging beam from the first grating 401 by an appropriate angle (e.g., subdivided into 510 subsections) and providing a corresponding second voltage V2 for the light beams of each subsection in the beam so that light beams of different intensities may be emitted from the lower surface of the lower substrate 10. Here, it should be noted that although the total reflection positions at the upper substrate 20 of light from the first grating 401 of different angles may be changed after passing through the liquid crystal layer 30 (for example, shifted left and right in the extended plane of the substrate), such offset is significantly smaller (for example, a few microns to dozens of microns, such as 90 microns) compared to the lateral dimension (i.e., the dimension in the extended plane of the substrate) of the corresponding liquid crystal prism 300, and therefore does not affect the normal display of each pixel or sub-pixel in the entire transparent liquid crystal display panel. In addition, it should also be mentioned that, although in this example an appropriate selection of the second voltage V2 is used to guarantee an accurate total reflection of each sub-part in the diverging beam, but as described in the previous paragraph, in other embodiments, it is also possible to keep the second voltage V2 unchanged and to achieve the same purpose by changing the first voltage V1. It will be readily appreciated by those skilled in the art.

The process of achieving different gray scale displays using the transparent liquid crystal display panel in the embodiments of the present disclosure has been explained in detail above. Next, it will continue to be discussed how such a transparent liquid crystal display panel is used to obtain a color display.

Figure 4:
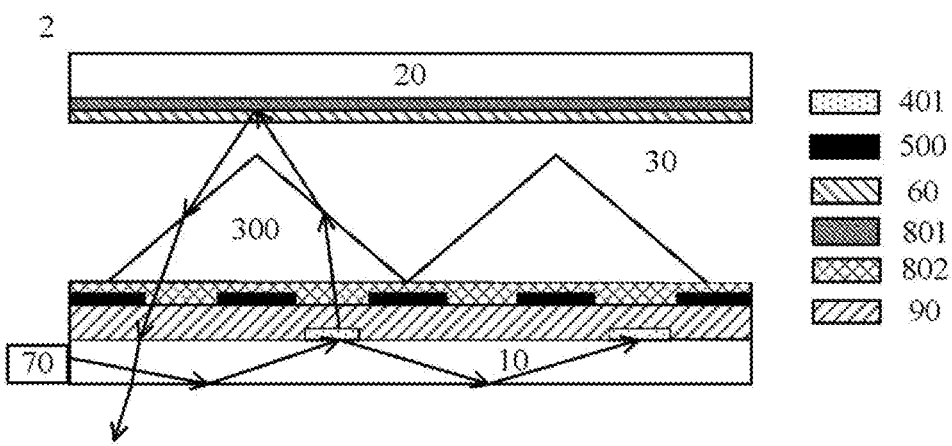
FIG. 4 is a cross-sectional view of a transparent liquid crystal display including the transparent liquid crystal display panel described above in an embodiment of the present disclosure.

A transparent liquid crystal display is further provided in an embodiment of the present disclosure, including a transparent liquid crystal display panel as described in any of the above embodiments. Referring to FIG. 4, a cross-sectional view of a transparent liquid crystal display including the above-described transparent liquid crystal display panel in an embodiment of the present disclosure is schematically shown. Specifically, the transparent liquid crystal display 2 may include a transparent liquid crystal display panel similar to that shown in FIG. 1 and an additional light source 70. For example, the light source 70 may be arranged at the lateral side of the lower substrate 10 of the transparent liquid crystal display panel, for example, at the left side of the lower substrate 10 in FIG. 2, so as to project the emitted light into the lower substrate 10. As an example, the light-emitting surface of the light source 70 may be the contact surface of the light source 70 with the lower substrate 10 (e.g., the right side of the light source 70 in FIG. 2), and light from the light source 70 may enter the lower substrate 10 by being refracted at this contact surface. Further, after entering the lower substrate 10, the light may propagate from left to right, for example, by the total internal reflection on the upper and lower surfaces of the lower substrate 10, as shown schematically by arrows in FIG. 4.

By way of example, in embodiments of the present disclosure, light source 70 may include a plurality of sub-light sources, where each sub-light source may be configured to emit light of a certain color. In particular, the light source 70 may include three sub-light sources, namely a first sub-light source for emitting red light, a second sub-light source for emitting green light, and a third sub-light source for emitting blue light. Such three sub-light sources, for example, a red LED, a green LED, and a blue LED, may be combined to form a light source 70 as shown in FIG. 1. Further, in such an embodiment, each display frame of the transparent liquid crystal display 2 may be similarly divided into a plurality of time periods, for example, a first time period, a second time period and a third time period which are consecutive. At this time, for example, the red LED may be configured to emit light only during the first period, the green LED may be configured to emit light only during the second period, and the blue LED may be configured to emit light only during the third period. That is, the three sub-light sources operate in a time division multiplexing manner during each display frame of the transparent liquid crystal display 2, and finally combine to provide a color display of each display frame. Obviously, as described above, in each period of the display frame, the second voltage V2 or the first voltage V1 applied to the first electrode layer 40 should be selected such that light of a corresponding color from the first grating 401 can be totally reflected on, for example, the upper substrate 20 after passing through the liquid crystal layer 30. In addition, in order to realize such time division multiplexing of light of different colors within a display frame, it is generally necessary to provide a corresponding clock circuit, a controller, and the like. All of these should be readily conceivable by those skilled in the art having the benefit of the teachings of the present disclosure, and therefore will not be explained in detail herein.

According to an embodiment of the present disclosure, various other modifications of a transparent liquid crystal display panel or a transparent liquid crystal display are also provided. Referring to FIG. 4, a cross-sectional view of a transparent liquid crystal display including the above-described transparent liquid crystal display panel in an embodiment of the present disclosure is schematically shown. Here, it should be noted that the transparent liquid crystal display panel in the transparent liquid crystal display 2 shown in FIG. 4 has substantially the same configuration as the transparent liquid crystal display 1 shown in FIG. 1, and thus the same reference numerals are used to refer to the same components, for example, the lower substrate 10, the upper substrate 20, the liquid crystal layer 30, the liquid crystal prism 300, the light source 70, the first grating 401, the first electrode 500, and the second electrode layer 60. Unlike the embodiment in FIG. 1, in this case, the transparent liquid crystal display panel of the transparent liquid crystal display 2 shown in FIG. 4, may further include a first dielectric layer 801 which is disposed between the upper substrate 20 and the first electrode layer 60 and has a refractive index lower than the upper substrate 20. For example, in the case that the upper substrate 20 is a glass substrate, the first dielectric layer 801 may be made of a medium having a refractive index of 1.25, and the thickness of the first dielectric layer 801 may be, for example, 1 micron. In the transparent liquid crystal display 2, light from the liquid crystal layer 30 will be returned to the liquid crystal layer 30 again due to the total reflection by the upper substrate 20. Therefore, in order to ensure this total reflection effect, according to an embodiment of the present disclosure, an additional dielectric layer having a low refractive index, i.e., the first dielectric layer 801, may be arranged below the upper substrate 20, so that the light from the liquid crystal layer 30 is more easily to be totally reflected on the upper side. In this manner, the risk of light leaking from above the upper substrate 20 is effectively prevented, thereby ensuring a good display effect of the entire transparent liquid crystal display 2.

Further, as shown in FIG. 4, the transparent liquid crystal display 2 may further include a second dielectric layer 802 and a planarization layer 90. Specifically, the second dielectric layer 802 may be disposed between the liquid crystal layer 30 and the first electrode layer 50 (including a plurality of first electrodes 500 arranged in an array). In this manner, on the one hand, an effective separation between the liquid crystal layer 30 and the first electrode layer 50 will be realized; on the other hand, by adding a dielectric layer over the array of the plurality of first electrodes 500, the liquid crystal layer 30 may be laid on a relatively flat layer (instead of a pattern distribution as an array), thereby ensuring a proper operation of the liquid crystal layer 30 (including the plurality of liquid crystal prisms 300 formed subsequently). Further, the space separation between the liquid crystal layer 30 and the first electrode layer 50 is formed by the second dielectric layer 802 so that the liquid crystal molecules in the liquid crystal layer 30 are relatively far away from the source generating the electric field (i.e., the first electrode 500 in the first electrode layer 50), whereby it is possible to ensure that the liquid crystal molecules may be placed in a relatively balanced electric field distribution, thereby ensuring that the formed equivalent liquid crystal prism 300 has good optical performance. Further, the planar layer 90 may be, for example, arranged between the first gratings 401 arranged in an array and the first electrode layer 50 (including the first electrodes 500 arranged in an array) in order to ensure a flat transition and effective separation between the two patterned coatings. By way of example, in an embodiment of the present disclosure, the refractive indices of the second dielectric layer 802 and the planarization layer 90 are smaller than the refractive indices of the upper and lower substrates made of glass, so as to promote an efficient transmission of light there through and prevent the leakage of light due to reflection, scattering, or the like, thereby ensuring high utilization of light.

Optionally, the transparent liquid crystal display panel such as that shown in FIG. 1 and/or a transparent liquid crystal display shown in FIG. 4, may further include an additional liquid crystal alignment layer. Such a liquid crystal alignment layer may be provided, for example, on the upper surface of the liquid crystal layer 30 and/or the lower surface of the liquid crystal layer 30, thereby providing an initial alignment for liquid crystal molecules in the liquid crystal layer 30. With respect to such liquid crystal alignment layers, those skilled in the art should readily appreciate, and will not be discussed in detail herein.

Figure 5:
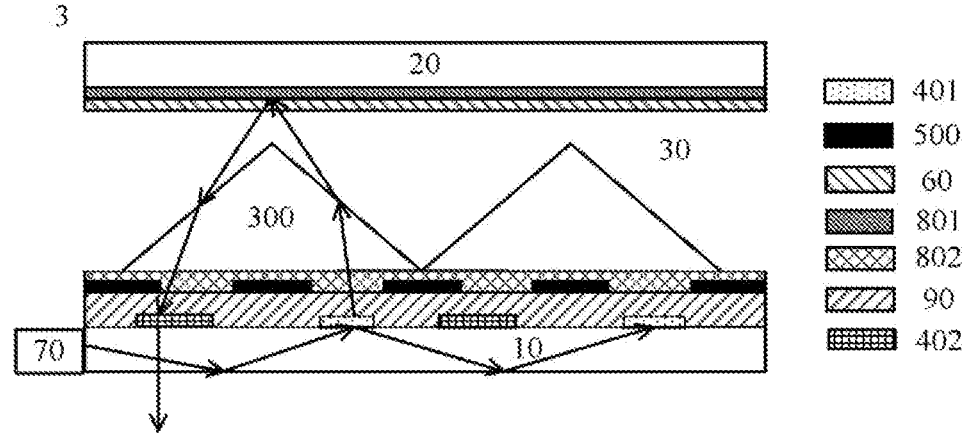
FIG. 5 is a cross-sectional view of a transparent liquid crystal display in another embodiment of the present disclosure.
Figure 6:
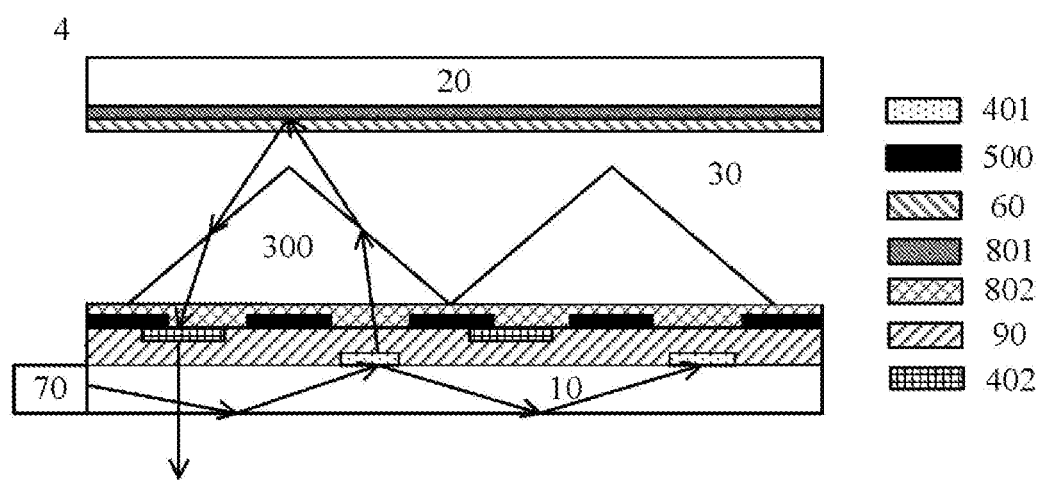
FIG. 6 is a cross-sectional view of a transparent liquid crystal display in another embodiment of the present disclosure.

Next, a transparent liquid crystal display panel and/or a transparent liquid crystal display in other embodiments of the present disclosure will be described in detail with reference to FIGS. 5-6. It should be noted that the transparent liquid crystal displays 3, 4 shown in FIGS. 5-6 have substantially the same configuration as the transparent liquid crystal display 2 shown in FIG. 3, and therefore the same reference numerals are used to refer to the same components, for example, the lower substrate 10, the upper substrate 20, the liquid crystal layer 30, the liquid crystal prism 300, the light source 70, the first grating 401, the first electrode 500, the second electrode layer 60, the first dielectric layer 801, the second dielectric layer 802, and the planarization layer 90. Unlike the transparent liquid crystal display in any of the previous embodiments, in the transparent liquid crystal displays 3, 4 as shown in FIGS. 5-6, a plurality of second gratings 402 (such as a second grating 402 having a size of 45 microns) arranged in an array may also be included, and an orthographic projection of each second grating 402 onto the lower substrate 10 is between orthographic projections of two adjacent first gratings 401 onto the lower substrate 10. With respect to such a second grating 402, there may be several different arrangements, and two representative arrangements are discussed below.

As shown in FIG. 5, a plurality of second gratings 402 may be arranged in the same layer as the plurality of first gratings 401 (specifically, the first grating layer 40), and there is no overlapping region between each other. That is, in the first grating layer 40, the first gratings 401 and the second gratings 402 are arranged in array respectively in a spatially alternating manner. Further, the second grating 402 may be configured to receive light returned from the liquid crystal layer 30 (i.e., the liquid crystal prism 300) to the first grating layer 40, and by means of a diffraction process (e.g., transmissive diffraction) similar to the first grating 401, the incident light exits from the lower side of the second grating 402 (i.e., the first grating layer 40) at another angle and enters into the lower substrate 10. As an advantageous implementation, parameters such as the grating period (e.g., between 300 nm and 800 nm) of the second grating 402 may be selected such that light emitted downward from the second grating 402 has a vertical emergence angle with respect to the lower substrate 10. In this case, due to the vertical incidence of the light, the light is emitted vertically from the lower substrate 10 with minimal loss. As a result, the loss of light in the entire transparent liquid crystal display 3 may be minimized, thereby achieving the highest utilization rate of the light source light.

As another implementation, as shown in FIG. 6, a plurality of second gratings 402 may also be disposed in a different layer from the plurality of first gratings 401. That is, a plurality of second gratings 402 may be formed in a layer different from the first grating layer 40. Optionally, a plurality of second gratings 402 may be formed over the first grating layer 40 on which the plurality of first gratings 401 are located. Similarly, as described above, the orthographic projection of each second grating 402 onto the lower substrate 10 is between the orthographic projections of two adjacent first gratings 401 onto the lower substrate 10. By arranging the plurality of second gratings 402 in layers different from the plurality of first gratings 401, on the one hand, the formation process of respective layers in the transparent liquid crystal display may be simplified; on the other hand, it is also possible to avoid adverse interference of the second grating 402 to the light from the lower substrate 10. The reason is that if the second grating 402 is formed in the first grating layer 40 above the lower substrate 10, i.e., in the same layer as the first grating 401, the second grating 402 may likewise destroy the total internal reflection propagation of light from the light source 70 within the lower substrate 10. That is, the light may be coupled out of the lower substrate 10 through the second grating 402. Therefore, by arranging a plurality of second gratings 402 in a separate film layer, optionally, in the film layer above the first grating layer 40 in which the first gratings 401 are located, unfavorable coupling of light from the lower substrate 10 into the liquid crystal layer 30 through the second gratings 402 may be effectively avoided, and finally the overall transparent liquid crystal display 4 is ensured to have excellent optical and/or display performance. As in the embodiment described above with reference to FIG. 5, in the transparent liquid crystal display 4 shown in FIG. 6, a suitable grating parameter (for example, a grating period or the like) may also be selected for the second grating 402 so as to ensure that light is emitted from the second grating 402 in a direction perpendicular to the lower substrate 10, and thereby reducing adverse loss of the light during transmission through multiple refraction.

Optionally, according to some embodiments of the present disclosure, in the transparent liquid crystal displays 2, 3, 4 proposed above, the light source 70 may be configured to emit linearly polarized light. Specifically, by attaching a polarizing plate to the light emitting surface of the light source 70 (for example, on the right side of the light source 70 in FIGS. 4, 5, and 6), it is possible to ensure that light incident from the light source 70 into the lower substrate 10 is linearly polarized light, and in particular, has a specific linear polarization direction suitable for the alignment of the liquid crystal in the liquid crystal layer 30. In view of this, by designing the incident light of the entire display, that is, the light from the light source 70, as linearly polarized light, the maximum utilization rate of the light source light may be obtained, thereby improving the optical performance and/or the display effect of the entire display. In addition, it can be seen that in the above embodiment, the polarizing plate is attached to the light emitting surface of the light source 70 on the side. Therefore, in the transmission direction of the ambient light, for example, in the transmission direction from the top to the bottom (for example, the display surface of the entire display is the lower surface), there will be no adverse loss of the ambient light due to the introduction of such a polarizing plate. That is, unlike a transparent liquid crystal display in the related art, in the embodiment of the present disclosure, even if a polarizer is introduced to provide linearly polarized incident light, adverse absorption of ambient light due to the presence of the polarizer does not occur. Therefore, the transmittance of the entire transparent liquid crystal display can be greatly improved. In addition, the light source 70 may further include a light guide member that enables light to be efficiently incident on, for example, the lower substrate 10.

A method of driving the transparent liquid crystal display panels described above is further provided in an embodiment of the present disclosure. Specifically, the method may include: applying voltages (e.g., a first voltage V1 and a second voltage V2, and another common voltage Vcom) to the plurality of first electrodes 500 and the second electrode layers 60, respectively, such that the liquid crystal layer 30 forms a plurality of liquid crystal prisms 300 arranged in an array, to enable light emitted from the plurality of liquid crystal prisms 300 to return to the plurality of liquid crystal prisms 300 after being reflected by the second substrate 20.

By way of example, in the transparent liquid crystal display panel 1 according to the embodiment of the present disclosure, the second electrode layer 60 includes a common electrode layer. In such a case, the method of driving the transparent liquid crystal display panel 1 may further include: applying a first voltage V1 to the first electrode 500 in the even-numbered column and applying a second voltage V2 different from the first voltage V1 to the first electrode 500 in the odd-numbered column in the array of the plurality of first electrodes 500.

As an example, in an embodiment of the present disclosure, the method of driving the transparent liquid crystal display panel 1 may further include: changing the intensity of light emitted from the plurality of liquid crystal prisms 300 by changing at least one of the first voltage V1 and the second voltage V2.

It should be noted that while specific dimensions, such as width, thickness, spacing, and the like, suitable for various components are shown by way of example in the drawings and described in detail, these are not intended to represent any limitation of the present disclosure. Indeed, all specific dimensions shown in the drawings and described in the specification are intended merely to provide a thorough understanding of the disclosure. Those skilled in the art, having the benefit of the technical teachings of the present disclosure, will be able to select any suitable size depending on the actual application.

It will be understood by those skilled in the art that the term "substantially" herein may also include embodiments having "completely," "completely," "all," and the like. Thus, in embodiments, the adjectives may also be removed substantially. Where applicable, the term "substantially" may also relate to 90% or more, such as 95% or more, specifically 99% or more, even more specifically 99.5% or more, including 100%. The term "and/or" specifically relates to one or more of the items mentioned before and after "and/or. For example, the phrases "item 1 and/or item 2" and the like may relate to one or more of item 1 and item 2. The term "comprising" in embodiments may mean "consisting of", but in another embodiment may mean "comprising at least the defined species and optionally one or more other species".

In addition, the terms first, second, third, and the like in the specification and claims are used to distinguish between similar elements and not necessarily to describe seriality or chronology. It is to be understood that the terms so used are interchangeable where appropriate, and that the embodiments of the present disclosure described herein are capable of operation in other sequences than those described or illustrated herein.

It should be noted that the above-mentioned embodiments illustrate rather than limit the disclosure, and that those skilled in the art will be able to design many alternative embodiments without departing from the scope of the appended claims. In the claims, any reference signs placed between parentheses shall not be construed as limiting the claim. The use of the verb "comprise" and its morphological changes does not rule out the presence of elements or steps other than those stated in a claim. The article "a" or "an" preceding an element does not rule out the presence of a plurality of such elements. The mere fact that certain measures are recited in mutually different dependent claims does not indicate that a combination of these measures cannot be used to advantage.

The various aspects discussed in the present disclosure may be combined to provide additional advantages. In addition, some of the features may form the basis of one or more divisional applications.

What is claimed is:

1. A transparent liquid crystal display panel, comprising:
   a first substrate and a second substrate oppositely to each other, wherein the first substrate is configured to enable light incident therein to be transmitted by a reflection;
   a liquid crystal layer between the first substrate and the second substrate;
   a first grating layer between the liquid crystal layer and the first substrate, wherein the first grating layer comprises a plurality of first gratings arranged in an array;
   a first electrode layer between the first grating layer and the liquid crystal layer, wherein the first electrode layer comprises a plurality of first electrodes arranged in an array; and
   a second electrode layer between the liquid crystal layer and the second substrate;
   wherein the liquid crystal layer is configured to form a plurality of liquid crystal prisms arranged in an array in the case that voltages are applied to the plurality of first electrodes and the second electrode layer respectively, to enable light emitted from the plurality of liquid crystal prisms to return to the plurality of liquid crystal prisms after being reflected by the second substrate.

2. The transparent liquid crystal display panel according to claim 1, wherein
   the light emitted from the plurality of liquid crystal prisms returns to the plurality of liquid crystal prisms again after being total reflected by the second substrate.

3. The transparent liquid crystal display panel according to claim 1, further comprising:
   a first dielectric layer between the liquid crystal layer and the second substrate, wherein a refractive index of the first dielectric layer is lower than a refractive index of the second substrate.

4. The transparent liquid crystal display panel according to claim 1, further comprising:
   a second grating layer between the first grating layer and the first electrode layer, wherein
   the second grating layer comprises a plurality of second gratings arranged in an array, and an orthographic projection of each second grating onto the first substrate is between orthographic projections of two adjacent first gratings onto the first substrate.

5. The transparent liquid crystal display panel according to claim 1, wherein
   the first grating layer further comprises a plurality of second gratings arranged in an array, and an orthographic projection of each second grating onto the first substrate is between orthographic projections of two adjacent first gratings onto the first substrate.

6. The transparent liquid crystal display panel according to claim 4, wherein
   the plurality of second gratings are configured to enable light incident thereon to exit perpendicularly to the first substrate.

7. The transparent liquid crystal display panel according to claim 1, wherein an orthographic projection of each of the first gratings onto the first substrate at least partially covers an area between orthographic projections, of two adjacent first electrodes at two sides of the first grating and adjacent to the first grating, onto the first substrate.

8. The transparent liquid crystal display panel according to claim 1, wherein
the second electrode layer comprises a common electrode layer, and
in the array of plurality of first electrodes, the first electrodes even-numbered columns are configured to receive a first voltage, and the first electrode odd-numbered columns are configured to receive a second voltage different from the first voltage.

9. The transparent liquid crystal display panel according to claim 8, wherein
the liquid crystal layer is further configured to enable an intensity of the light emitted from the plurality of liquid crystal prisms varies with a change in at least one of the first voltage and the second voltage.

10. The transparent liquid crystal display panel according to claim 1, further comprising one or more of:
a liquid crystal alignment layer on at least one of a first surface of the liquid crystal layer adjacent to the first substrate and a second surface of the liquid crystal layer adjacent to the second substrate;
a second dielectric layer between the liquid crystal layer and the first electrode layer; and
a planarization layer between the first electrode layer and the first grating layer.

11. A transparent liquid crystal display, comprising:
the transparent liquid crystal display panel according to claim 1; and
a light source at a lateral side of the first substrate and configured to emit light into the first substrate.

12. The transparent liquid crystal display according to claim 11, wherein
the light source comprises a first sub-light source configured to generate red light, a second sub-light source configured to generate green light and a third sub-light source configured to generate blue light, and
each display frame of the transparent liquid crystal display comprises a first period, a second period and a third period, wherein
the first sub-light source is configured to emit light during the first period, the second sub-light source is configured to emit light during the second period, and the third sub-light source is configured to emit light during the third period.

13. The transparent liquid crystal display according to claim 11, further comprising a polarizing plate attached to a light emitting surface of the light source.

14. A method of driving the transparent liquid crystal display panel according to claim 1, comprising:
applying voltages to the plurality of first electrodes and the second electrode layer respectively, such that the liquid crystal layers form a plurality of liquid crystal prisms arranged in an array, to enable light emitted from the plurality of liquid crystal prisms to return to the plurality of liquid crystal prisms after being reflected by the second substrate.

15. The driving method according to claim 14, wherein the second electrode layer comprises a common electrode layer, and the method further comprises:
applying a first voltage to the first electrodes in even-numbered columns of the array of plurality of first electrodes and applying a second voltage different from the first voltage to the first electrodes in odd-numbered columns of the array of plurality of first electrodes.

16. The driving method according to claim 15, further comprising:
changing an intensity of the light emitted from the plurality of liquid crystal prisms by changing at least one of the first voltage and the second voltage.

* * * * *